United States Patent [19]
King, Sr.

[11] 3,854,768
[45] Dec. 17, 1974

[54] PIPE PULLING DEVICE

[76] Inventor: Lloyd H. King, Sr., 311 Blake Rd., Hopkins, Minn. 55343

[22] Filed: Jan. 2, 1974

[21] Appl. No.: 430,204

[52] U.S. Cl............... 294/102 R, 279/28, 294/86.3, 403/290, 403/371, 403/374
[51] Int. Cl............................................. B66c 1/48
[58] Field of Search............ 294/86.28, 86.3, 86.31, 294/86.32, 96, 99 R, 102, 116; 24/136 R, 136 B, 263 SW, 263 B; 254/29 R, 133 R, 134.3 R, 134.3 FT; 279/1 F, 1 SG, 28, 43, 50, 74; 403/290, 314, 371, 374

[56] References Cited
UNITED STATES PATENTS

| 991,176 | 5/1911 | Speer | 294/102 R |
| 1,123,615 | 1/1915 | Stewart | 279/28 X |
| 1,590,280 | 6/1926 | Buchanan | 294/102 R |
| 2,114,988 | 4/1938 | Anthony | 294/86.31 |
| 2,781,222 | 2/1957 | Smith | 294/86.3 |

Primary Examiner—Evon C. Blunk
Assistant Examiner—Johnny D. Cherry
Attorney, Agent, or Firm—Leo Gregory

[57] ABSTRACT

A rigid wall pipe pulling device comprising a substantially tubular housing having one open end and having holding means from the closed end thereof, said housing having a bore therein tapered in the direction of said open end, a tapered boss projecting from the inner closed end of said bore, a tubular holding member conforming to the taper of said bore and having a non-smooth inner surface and having a slotted portion thereof disposed within said bore and a pipe received into said holding member whereby said holding member when drawn in a direction outwardly of said housing is circumferentially reduced to firmly engage and secure said pipe therein and said holding member on being moved inwardly of said housing for engagement with said boss is spread by said boss to release said pipe therein.

3 Claims, 4 Drawing Figures

PATENTED DEC 17 1974

3,854,768

PIPE PULLING DEVICE

BACKGROUND AND SUMMARY OF THE INVENTION

This invention relates to a device for pulling a pipe through a narrow opening or slit in the ground in connection with laying an underground sprinkler system. Particular reference is had herein to a plastic pipe. Generally, a blade is used to make a knife-like slit into the ground so that there will be a minimal disturbance of the surface and the pipe is pulled into position by a machine operating the blade.

It is an object of this invention to provide a device to pull a pipe through a slit or tunnel in the ground.

It is more specifically an object of this invention to provide a device arranged and constructed to engage the end portion of a plastic pipe without damaging the pipe in having sufficient frictional engagement therewith to pull such a pipe through a slit or trench in the ground.

More generally described, it is an object of this invention to comprise a substantially tubular housing having a holding means extending from a closed end thereof and having a bore therein tapered in the direction of the other or open end thereof, a tubular holding member having a slotted portion extending into said bore, a pipe received within said holding member, said holding member having a non-smooth inner surface and a tapered boss projecting from the inner closed end of said bore.

It is another object of this invention therefore to provide a plastic pipe pulling device comprising a housing having a tapered bore therein, a tubular holding member within said housing reducible circumfrentially when drawn in a direction outwardly of said housing, said tubular member having a non-smooth inner surface and a pipe disposed inwardly of said tubular member to be frictionally held therein.

It is also an object of this invention to have a plastic pipe pulling device providing for very simple pipe pulling engagement and disengagement.

These and other objects and advantages of the invention will be set forth in the following description made in connection with the accompanying drawings in which like reference characters refer to similar parts throughout the several views and in which.

DESCRIPTION OF A PREFERRED EMBODIMENT

Figure 1:
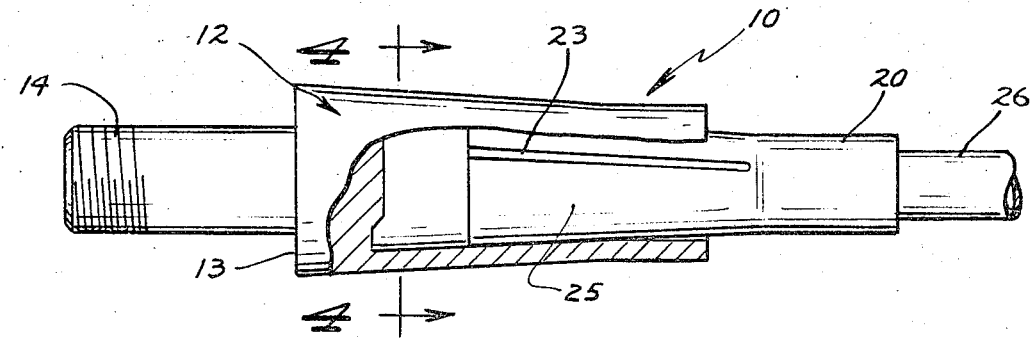
FIG. 1 is a view in side elevation with a portion thereof being broken away.

Referring to the drawings, a preferred embodiment of the device herein is indicated generally by the reference numeral 10. Said device is here shown in an operative association with a hard or rigid wall plastic pipe 26 such as is suitable for an underground sprinkling system.

Comprising said device is a housing 12 which may have any suitable configuration and which is shown here to be substantially tubular in form having a closed end portion 13 from which extends a holding means comprising a coupling member or handle 14 shown here in the form of a stub shaft having a threaded outer end portion.

Formed within said housing is a bore 15 tapered in the direction of the open end 18 of said housing.

At the inner closed end 16 of said bore centrally thereof is a projecting tapered boss 19.

Disposed within said bore and extending outwardly thereof is a tubular holding member 20 having a bore 21 therein. Said holding member conforms substantially to the taper of said bore 15 and has spaced about the portion thereof within said bore a plurality of elongated slots 23 open-ended at the inner end thereof forming a slotted portion 25. Said holding member has a non-smooth bore surface here illustrated formed as a tooth-like or serrated surface 22. The inner end of said bore 21 has a bevelled portion 24. Disposed into said holding member 20 is said pipe member 26.

Said boss has a diameter such that when said boss is received within said bore of said tubular holding member, the adjacent slotted wall portion of said holding member will spread.

OPERATION

Figure 2:
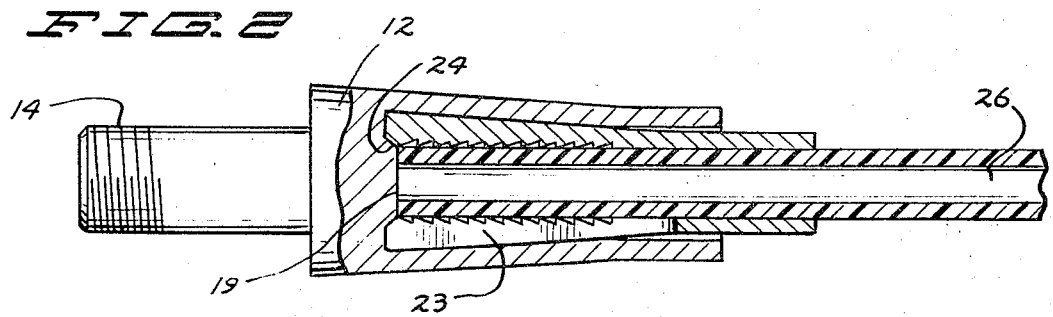
FIG. 2 is a view substantially in longitudinal vertical section showing the device in one operating position.

In operation, the holding member 20 is moved inwardly of the housing 10 to have its bevelled inner end portion 24 engage said tapered boss 19 to spread the slotted portion of said holding member 20. A pipe to be pulled, such as pipe 26, is disposed into said holding member as is indicated in FIG. 2.

Figure 3:
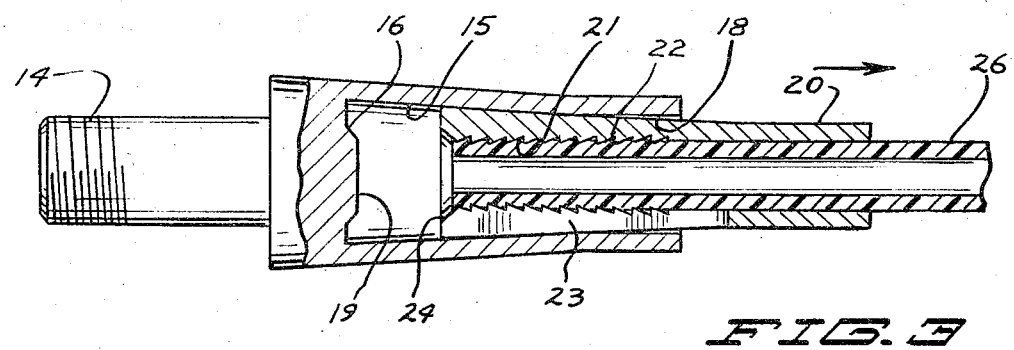
FIG. 3 is a view similar to FIG. 2 showing the device in operating position.
Figure 4:
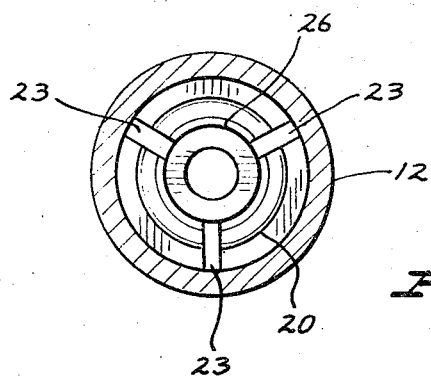
FIG. 4 is a view in vertical cross section taken on line 4—4 of FIG. 1 as indicated.

The holding means 14 may be grasped manually or by an appropriate tool and jerked forwardly or the extended end of said holding member 20 may be jerked rearwardly in a direction away from said housing 10 for relative movement of said holding member and said housing in opposite directions to draw the holding member outwardly of said housing. As said holding member is moved outwardly of said housing, the taper of said bore 15 reduces the slotted portion 25 of said holding member circumferentially to frictionally engage therein said pipe 26 and to hold said pipe securely against withdrawal therefrom, as shown in FIG. 3.

Here the inner surface 21 of said holding member is shown having circular rows of tooth-like projections which very firmly engage and hold said pipe 26 without damage to said pipe.

The pipe is readily released. For release, the holding member is struck at its free extended end by an appropriate tool to be moved inwardly of said housing to have the bore at its inner end portion receive said tapered boss 19 whereby as the result of this engagement the inner slotted end portion of said holding member is spread to release the pipe 26 and said pipe is readily withdrawn therefrom.

This device is very effective and represents substantial labor and time saving in connection with laying pipe for installing an underground sprinkling system.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A pipe pulling device having in combination
a housing having a closed end,
a holding means extending from said closed end, said housing having a bore therein extending from the closed end thereof and tapering in the direction of the open other end of said housing, a tapered boss projecting into said bore from the closed end thereof, a tubular holding member disposed in said bore and extending outwardly thereof, said holding member having a plurality of elongated slots therein spaced about the portion thereof disposed within said bore, said holding member having a bore having non-smooth inner surface, and said boss being received within the adjacent slotted end portion of said holding member within said bore thereof, said boss having a diameter such as to spread said adjacent end of said last-mentioned bore.

2. The structure set forth in claim 1, wherein said holding member has an internally bevelled end portion about said bore adjacent said boss.

3. The structure set forth in claim 1, wherein said bore of said holding member has a surface comprising tooth-like projections.

* * * * *